(12) United States Patent
Anker et al.

(10) Patent No.: US 8,969,445 B2
(45) Date of Patent: *Mar. 3, 2015

(54) POLYOLEFIN COMPOSITION FOR WATER PIPES WITH GOOD RESISTANCE TO CHLORINE DIOXIDE AND LOW MIGRATION

(75) Inventors: Martin Anker, Hisings Karra (SE); Per-Ola Hagstrand, Stenungsund (SE); Svein Jamtvedt, Stathelle (NO); Tanja Piel, Stenungsund (SE)

(73) Assignee: Borealis AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 13/141,660

(22) PCT Filed: Dec. 17, 2009

(86) PCT No.: PCT/EP2009/009094
§ 371 (c)(1),
(2), (4) Date: Jun. 22, 2011

(87) PCT Pub. No.: WO2010/072373
PCT Pub. Date: Jul. 1, 2010

(65) Prior Publication Data
US 2011/0257311 A1 Oct. 20, 2011

(30) Foreign Application Priority Data

Dec. 22, 2008 (EP) .................... 08022277

(51) Int. Cl.
*C08L 23/02* (2006.01)
*C08L 23/06* (2006.01)
*C08K 5/13* (2006.01)
*C08K 5/1545* (2006.01)
*F16L 9/12* (2006.01)
*F16L 9/127* (2006.01)

(52) U.S. Cl.
CPC ................ *F16L 9/127* (2013.01); *C08L 23/06* (2013.01); *C08L 23/02* (2013.01); *C08K 5/13* (2013.01); *C08K 5/1545* (2013.01); *F16L 9/12* (2013.01)
USPC ....................................... 524/110

(58) Field of Classification Search
CPC .......... C08K 5/13; C08K 5/1545; F16L 9/12; F16L 9/127; C08L 23/02; C08L 23/06
USPC ......................... 524/110; 428/36.9
See application file for complete search history.

(56) References Cited

U.S. PATENT DOCUMENTS

| 4,532,165 A | 7/1985 | Hashimoto et al. |
| 8,443,846 B2 * | 5/2013 | Hagstrand et al. ............ 138/178 |
| 2010/0266798 A1 * | 10/2010 | Anker et al. ................. 428/36.9 |
| 2012/0000538 A1 * | 1/2012 | Hagstrand et al. ................. 137/1 |

FOREIGN PATENT DOCUMENTS

| EP | 0124664 A1 | 11/1984 | |
| EP | 0569950 A1 | 11/1993 | |
| EP | 0739937 A2 | 10/1996 | |
| EP | 0810235 A2 | 12/1997 | |
| EP | 1024165 A1 | 8/2000 | |
| EP | 1911799 A1 | 4/2008 | |
| EP | 2014704 A1 | 1/2009 | |
| GB | 2305180 A | 4/1997 | |
| JP | 62158737 A | 7/1987 | |
| WO | 97/49758 A1 | 12/1997 | |
| WO | 02/102891 A1 | 12/2002 | |
| WO | 2004/055068 A1 | 7/2004 | |
| WO | 2004/055069 A1 | 7/2004 | |
| WO | WO 2005056657 A2 * | 6/2005 | ............... C08K 5/00 |
| WO | 2008/103128 A1 | 8/2008 | |
| WO | WO 2009037101 A1 * | 3/2009 | .............. C08L 23/04 |

OTHER PUBLICATIONS

International Search Report for International Application No. PCT/EP2009/009094.
Written Opinion of the International Searching Authority for International Application No. PCT/EP2009/009094.

* cited by examiner

*Primary Examiner* — Angela C Scott
(74) *Attorney, Agent, or Firm* — Roberts Mlotkowski Safran & Cole, P.C.

(57) ABSTRACT

The present invention relates to a polyolefin composition with good resistance to degradation caused by chlorine dioxide-containing water and at the same time showing low migration of the used additives and its decomposition products, especially phenols, out of the composition. The present invention is also directed to a pipe made of such a polyolefin composition. The present invention further relates to the use of the polyolefin composition for the production of a pipe and to the use of a combination of particular types of antioxidants for increasing the resistance of a polyolefin composition against degradation caused by contact with chlorine dioxide-containing water and for maintaining at the same time a low migration of the used additives and its decomposition products, especially phenols, out of the polyolefin composition.

8 Claims, No Drawings

POLYOLEFIN COMPOSITION FOR WATER PIPES WITH GOOD RESISTANCE TO CHLORINE DIOXIDE AND LOW MIGRATION

The present invention relates to a polyolefin composition with good resistance to degradation caused by chlorine dioxide-containing water and at the same time showing low migration of the used additives and its decomposition products, especially phenols, out of the composition. The present invention is also directed to a pipe made of such a polyolefin composition. The present invention further relates to the use of the polyolefin composition for the production of a pipe and to the use of a combination of particular types of antioxidants for increasing the resistance of a polyolefin composition against degradation caused by contact with chlorine dioxide-containing water and for maintaining at the same time a low migration of the used additives and its decomposition products, especially phenols, out of the polyolefin composition.

Recent progress in the manufacturing and processing of polymers has led to the application of plastics in virtually every aspect of modern day life. However, polymeric compounds are prone to aging under the effects of oxidants, light and heat. This results in a loss of lifetime such as loss of strength, stiffness and flexibility, discoloration and scratching as well as loss of gloss.

It is well-known in the art that antioxidants and light stabilizers can prevent or at least reduce these effects. Several types of additives are added to polymers to protect them during processing and to achieve the desired end-use properties. Additives are generally divided in stabilizers and modifiers. Stabilizers, like antioxidants, traditionally and currently used comprise sterically hindered phenolics, aromatic amines, hindered amine stabilizers, organo-phosphites/phosphonites and thioethers. However, appropriate combinations of stabilizers have to be carefully selected, depending on the desired final properties, the polymeric article should have and depending on the field of application.

JP 62-158 737 discloses a polyolefin composition with excellent thermal process stability and colouring resistance comprising a 6-hydroxy coumarone compound and a phenolic compound or a phosphonite compound.

EP 1 024 165 discloses a stabilizer composition for organic polymeric materials containing 6-hydroxychroman compounds and a phenolic antioxidant.

WO 97/49758 discloses stabilizer compositions comprising at least one sterically hindered phenol, at least one phosphorus-containing antioxidant and at least one tocopherol compound.

WO 2008/103128 discloses a process for slowing down diffusion of an element or a compound through a fluoroplastic comprising the addition of a reactive additive that reacts with the element or compound. Said element or compound is e.g. chlorine or a chlorine compound such as chlorine dioxide or hypochloric acid. The reactive additive is a hindered phenol, an amine, vitamin E, lignin or a phenolic compound.

Besides many other applications, polyolefins are used for the preparation of pipes for drinking water distribution systems. It is known that chlorine in different molecular forms is used as disinfectant in water treatment to prevent spread of infectious diseases. It is also known that most materials, including many polymers such as polyolefins, age in chlorinated water. Results from pressure testing in laboratories and experience from the field have shown that high concentration of chlorine in water can cause early brittle fracture in polyolefin pipes.

EP 124 664 discloses Poly-1-butene resin compositions suitable for pipes comprising at least one particular hindered phenol antioxidant for achievement of resistance against chlorinated water. Said compositions preferably comprise at least one further antioxidant selected from the group tocopherol, 2,6-di-tert-butyl-p-cresol and tris(2,4-di-tert-butylphenyl)phosphite.

A further disinfectant used in water is chlorine dioxide, $ClO_2$. Hence, chlorine dioxide-containing water is in permanent contact with the pipe material. Due to the permanent contact to the inner pipe surface, deterioration of the polyolefin composition is caused.

It has been found that antioxidants used in polyolefin compositions for pipes known to provide a good resistance to chlorinated water do not necessarily provide satisfactory resistance against chlorine dioxide-containing water. Thus, there is still a need for a more efficient antioxidant which provides a better protection against $ClO_2$-containing water to a polyolefin composition, and thus allows for a longer lifetime of e.g. a pipe, made of a polyolefin composition containing such an antioxidant.

A further important issue as regards the presence of antioxidants in polyolefin compositions is the aim to reduce migration of antioxidants or products received therefrom into media transported e.g. in a pipe made of such a polyolefin composition. This is particularly important in case of a pipe transporting drinking water. Due to the permanent contact to the inner pipe surface, compounds can migrate from the pipe material into the water. The admissible amounts of compounds within the drinking water are fixed by legal requirements and even stricter requirements are to be expected in Europe or other countries.

EP 2 014 704 discloses a low migration polyolefin composition comprising a vitamin E-type stabilizer and a phenolic stabilizer.

Migration behavior of stabilizers and modifiers added to polyolefin-based materials is dependent from a number of different properties such as diffusion rate of the molecules within the polymer matrix, chemical stability of the additives, etc. Similar considerations apply for decomposition products of said stabilizers and modifiers. Furthermore, it has to be taken into account that an improvement in migration behavior must not be obtained on the expense of stabilization of the polymer matrix. Thus, providing an additive composition of low migration tendency is not straight-forward but rather needs a careful selection of appropriate compounds.

GB 2 305 180 discloses polyolefin compositions which are in permanent contact with extracting, media, e.g. water, these compositions further comprising organic phosphites/phosphonites, phenolic compounds or sterically hindered amines as stabilizing components.

However, considering stricter legal requirements to be expected in the near future, it is highly appreciated to provide pipes of high thermal and chemical stability and releasing only very small amounts of additives and/or decomposition products into the water.

Generally speaking, it is preferred to use as low concentrations of antioxidant as possible in order to lower the amount of antioxidant which may possibly be extracted by the water transported in the pipe. Further in this context, it is desirable that the antioxidant used has a low tendency to extraction by the water transported in the pipe.

These issues are addressed in EP 1 911 799 wherein classes of antioxidants for polyolefin compositions for pipes are provided which improve the resistance against chlorine dioxide-containing water. However, the reported resistance is still lower than the resistance against chlorinated water.

Hence, there is still a need for improved polyolefin compositions suitable for water pipe applications, particularly for polyolefin compositions having an increased lifetime in contact to chlorine dioxide-containing water which polyolefin compositions at the same time show low migration of the used additives and its decomposition products, especially phenols, out of the composition.

Thus, it is an object of the present invention to provide a polyolefin composition for pipes having an increased lifetime in permanent contact with chlorine dioxide-containing water and showing low migration of the used additives and its decomposition products, especially phenolic decomposition and/or by-products, out of the composition.

The present invention is based on the finding that the object of the invention can be achieved, if the polyolefin composition comprises a specific combination of two types of antioxidants, wherein at least one of said antioxidants is present in a certain amount.

Therefore, the present invention relates to a polyolefin composition comprising
a) a polyolefin base resin (A) comprising a polyethylene homo- or copolymer,
b) an antioxidant (B) according to formula (I):

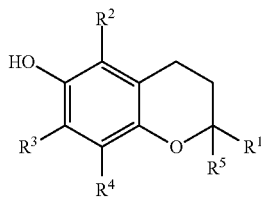

wherein $R^1$, $R^2$, $R^3$, $R^4$ and $R^5$ independently are H, or non-substituted or substituted aliphatic or aromatic hydrocarbyl radicals which may comprise heteroatoms,
c) an antioxidant (C) according to formula (II):

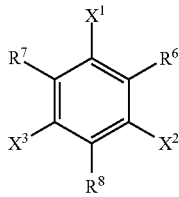

wherein
$R^6$, $R^7$ and $R^8$ independently are non-substituted or substituted aliphatic or aromatic hydrocarbyl radicals which may comprise OH-groups,
$X^1$, $X^2$, and $X^3$ independently are H or OH, with the provisio that at least one of $X^1$, $X^2$ and $X^3$ is OH,
the entire molecule does not comprise an ester group, and
the concentration of antioxidant (C) in the polyolefin composition is at least 1200 ppm, based on the total composition.

It has been found that the polyolefin compositions according to the invention show good resistance to degradation caused by chlorine dioxide-containing water and at the same time show low migration of the used additives and its decomposition products, especially phenolic decomposition and/or by-products, out of the composition.

The heteroatoms which may be present in the non-substituted or substituted aliphatic or aromatic hydrocarbyl radicals $R^1$, $R^2$, $R^3$, $R^4$ and/or $R^5$ of antioxidant (B) according to formula (I) may be oxygen, sulphur, nitrogen, phosphorus or the like. It is, however, preferred that $R^1$, $R^2$, $R^3$, $R^4$ or $R^5$, more preferred $R^1$, $R^2$, $R^3$, $R^4$ and $R^5$, do not comprise heteroatoms, i.e. are non-substituted or substituted aliphatic or aromatic hydrocarbyl radicals only, or, as mentioned, H.

Furthermore, preferably $R^2$, $R^3$, $R^4$ or $R^5$, more preferably $R^2$, $R^3$, $R^4$ and $R^5$, are H, or saturated aliphatic hydrocarbyl radicals comprising from 1 to 5 carbon atoms, and still more preferably $R^2$, $R^3$, $R^4$ or $R^5$, more preferably $R^2$, $R^3$, $R^4$ and $R^5$, are H, or methyl groups.

Furthermore, preferably $R^5$ is a methyl group, regardless of the nature of the other residues $R^2$ to $R^4$.

In an especially preferred embodiment, $R^4$ and $R^5$ are methyl groups, and $R^2$ and $R^3$ are H, or methyl groups.

Most preferably, $R^2$, $R^3$, $R^4$ and $R^5$ are all methyl groups.

Still further, preferably $R^1$ is a non-substituted or substituted aliphatic or aromatic hydrocarbyl radical containing from 5 to 50 carbon atoms, more preferably $R^1$ is a non-substituted or substituted aliphatic hydrocarbyl radical containing from 5 to 50, more preferably from 10 to 30, carbon atoms, and most preferably $R^1$ is a 4,8,12-trimethyl-tridecyl group.

Still more preferred, antioxidant (B) is 2,5,7,8-Tetramethyl-2-(4',8',12'-trimethyltridecyl)chroman-6-ol (Vitamine E).

In antioxidant (C) according to formula (II) residues $R^6$, $R^7$ and $R^8$ independently are non-substituted or substituted aliphatic or aromatic hydrocarbyl radicals which may comprise OH-groups. This means that apart from OH-groups no further heteroatoms are present in $R^6$, $R^7$ and $R^8$, so that phenolic stabilizer (C) is e.g. free of ester groups, amide groups and groups containing phosphorus.

Preferably, $R^6$, $R^7$ and $R^8$ which independently are non-substituted or substituted aliphatic or aromatic, more preferably aliphatic, hydrocarbyl radicals which may comprise OH-groups, have from 2 to 200 carbon atoms.

Preferably, $R^6$ and $R^7$ independently have from 2 to 20 carbon atoms, more preferably from 3 to 10 carbon atoms.

Furthermore, it is preferred that $R^6$ and/or $R^7$, more preferably $R^6$ and $R^7$, are aliphatic hydrocarbyl groups with at least 3 carbon atoms which have a branch at the second carbon atom, and most preferably $R^6$ and/or $R^7$, more preferably $R^6$ and $R^7$, are tert. butyl groups.

Preferably, $R^8$ has from 20 to 100 carbon atoms, more preferably has from 30 to 70 carbon atoms.

Furthermore, it is preferred that $R^8$ includes one or more phenyl residues.

Still further, it is preferred that $R^8$ includes one or more hydroxyphenyl residues.

In the most preferred embodiment, $R^8$ is a 2,4,6-tri-methyl-3,5-di-(3,5,-di-tert. butyl-4-hydroxyphenyl)benzene residue.

Preferably, in antioxidant (C) of formula (II) $X^1$ is OH, and most preferably $X^1$ is OH and $X^2$ and $X^3$ are H.

It is particularly preferred that antioxidant (C) is 1,3,5-Trimethyl-2,4,6-tris-(3,5-di-tert. butyl-4-hydroxyphenyl)benzene (Irganox 1330).

The concentration of antioxidant (B) in the polyolefin composition is preferably at least 50 ppm, more preferably at least 100 ppm, still more preferably at least 150 ppm, based on the total composition.

The concentration of antioxidant (B) in the polyolefin composition is preferably 5000 ppm or less, more preferably 2000 ppm or less, still more preferably 1000 ppm or less, still more preferably 500 ppm or less and most preferably 300 ppm or less, based on the total composition.

Preferably, the concentration of antioxidant (C) in the polyolefin composition is at least 1600 ppm, more preferably at least 2500 ppm, still more preferably at least 3400 ppm, based on the total composition.

The concentration of antioxidant (C) in the polyolefin composition is preferably 10000 ppm or less, more preferably 8000 ppm or less, still more preferably 5000 ppm or less, based on the total composition.

Furthermore, from the polyolefin composition of the invention an amount of at most 20 microgram of phenolic decomposition and/or by-products per liter of water (microg/liter) migrates into water, more preferably of at most 10 microg/liter, and most preferably of at most 5 microg/liter, measured according to the migration-into-water analysis method as described in the examples section.

The term "phenolic decomposition and/or by-products" denotes those phenolic compounds present in the composition, which either were formed by the decomposition of phenolic compounds which have been originally incorporated into the composition or which are phenolic by-products present in the phenolic compounds, as impurities, e.g. phenolic compounds with different structure to those intentionally added. As usually, and preferably, the only phenolic compounds incorporated into the composition are stabilizers, usually, and preferably, the only phenolic decomposition products present in the composition are originating from the stabilizers added.

The term "base resin" denotes the entirety of polymeric components in the polyolefin composition according to the invention, usually making up at least 90 wt % of the total composition.

It is preferred that the base resin (A) consists of a polyethylene homo- or copolymer.

In one embodiment of the invention the base resin comprises two or more polyethylene fractions with different weight average molecular weight. Such resins usually are denoted as multimodal resins.

Polyolefin, in particular polyethylene, compositions comprising multimodal resins are frequently used e.g. for the production of pipes due to their favourable physical and chemical properties as e.g. mechanical strength, corrosion resistance and long-term stability. Such compositions are described e.g. in EP 0 739 937 and WO 02/102891. The term molecular weight used herein generally denotes the weight average molecular weight $M_w$.

As mentioned, usually a polyethylene composition comprising at least two polyolefin fractions, which have been produced under different polymerisation conditions resulting in different weight average molecular weights for the fractions, is referred to as "multimodal". The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

In the preferred embodiment wherein the base resin consists of two polyethylene fractions, the fraction having a lower weight average molecular weight is denoted fraction (A), the other is denoted fraction (B).

Fraction (A) preferably is an ethylene homopolymer.

Fraction (B) of the polyethylene composition preferably is an ethylene copolymer, and preferably comprises at least 0.1 mol % of at least one alpha-olefin comonomer. The amount of comonomer is preferably at most 14 mol %.

The base resin of the polyethylene composition preferably comprises at least 0.1 mol %, more preferably at least 0.3 mol %, and still more preferably at least 0.7 mol % of at least one alpha-olefin comonomer. The amount of comonomer is preferably at most 7.0 mol %, more preferably at most 6.0 mol %, and still more preferably at most 5.0 mol %.

As an alpha-olefin comonomer, preferably an alpha-olefin having from 4 to 8 carbon atoms is used. Still more preferably an alpha-olefin selected from 1-butene, 1-hexene, 4-methyl-1-pentene and 1-octene is used.

The polyolefin base resin preferably has an $MFR_5$ (190° C., 5 kg) of from 0.1 to 2.0 g/10 min, more preferably from 0.2 to 1.5 g/10 min, and most preferably from 0.5 to 1.0 g/10 min.

The density of the base resin preferably is from 930 to 960 kg/m$^3$, more preferably is from 935 to 958 kg/m$^3$, and most preferably is from 936 to 955 kg/m$^3$.

In addition to the base resin and the antioxidants, usual additives for utilization with polyolefins, such as pigments (for example carbon black), stabilizers, antiacids and/or anti-UVs, antistatic agents and utilization agents (such as processing aid agents) may be present in the polyolefin composition.

The amount of such additives usually is 10 wt % or below.

The polymerisation catalysts for the production of the base resin include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst, more preferably the catalyst is a non-silica supported ZN catalyst, and most preferably a $MgCl_2$-based ZN catalyst.

The Ziegler-Natta catalyst further preferably comprises a group 4 (group numbering according to new IUPAC system) metal compound, preferably titanium, magnesium dichloride and aluminium.

The catalyst may be commercially available or be produced in accordance or analogously to the literature. For the preparation of the preferable catalyst usable in the invention, reference is made to WO 2004/055068 and WO 2004/055069 of Borealis and EP 0 810 235. The content of these documents in its entirety is incorporated herein by reference, in particular concerning the general and all preferred embodiments of the catalysts described therein as well as the methods for the production of the catalysts. Particularly preferred Ziegler-Natta catalysts are described in EP 0 810 235.

The composition preferably is produced in a process comprising a compounding step, wherein the base resin—which is typically obtained as a base resin powder from the reactor—together with the antioxidants and optionally other additives is extruded in an extruder to yield the composition according to the present invention.

Of course, when using the inventive composition, further compounds selected from conventional additives, fillers, minerals and lubricants may be added for improving processability and surface characteristics thereof.

The composition of the present invention is preferably used in pipes—black as well as natural (i.e. non-colored) or colored pipes. Preferably, such a pipe is used in a drinking water supply system. It is furthermore preferred that the pipe is a cold water pipe, i.e. that it is designed for the transport of cold water.

Hence, the present invention is also directed to a pipe comprising the inventive polyolefin compositions mentioned above including all the preferred embodiments. Such pipes show an improved resistance against chlorine dioxide-containing water and also show a low migration of additives and decomposition products thereof into water being in contact with said pipe.

The pipes are preferably produced by extrusion of the inventive polyolefin composition.

The present invention is therefore also directed to the use of a polyolefin composition according to the invention, including all of the preferred embodiments, for the production of a pipe.

The present invention is also directed to the use of said inventive pipes for the transport of chlorine dioxide-containing water.

Finally, the present invention is further directed to the use of a combination of antioxidants (B) and (C) as defined above, including all of the preferred embodiments, for increasing the resistance of a polyolefin composition against degradation caused by contact with chlorine dioxide-containing water. Such polyolefin compositions at the same time show a low migration of the used additives and its decomposition products, especially phenols, out of the composition.

EXAMPLES

1. Definitions and Measurement Methods a) Density

Density is measured according to ISO 1183. Sample preparation is done in accordance with ISO 1872/2B.

b) Melt Flow Rate/Flow Rate Ratio

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and may be determined at different loadings such as 2.16 kg ($MFR_2$), 5.00 kg ($MFR_5$) or 21.6 kg ($MFR_{21}$).

The quantity ERR (flow rate ratio) is an indication of molecular weight distribution and denotes the ratio of flow rates at different loadings. Thus, $FRR_{21/5}$ denotes the value of $MFR_{21}/MFR_5$.

c) Measurement of Lifetime of Pipes in Contact with $ClO_2$

No standard exists yet for evaluating the resistance of pipes comprising a polyethylene composition to $ClO_2$-containing water. However, there is a standard for measuring the resistance to chlorinated water: ASTM F2263-03, "Standard test method for evaluating the oxidative resistance of Polyethylene (PE) pipe to chlorinated water". The lifetime of the pipes is tested accordingly with equipment according to ASTM F2263-03. However, $ClO_2$ is applied instead of chlorine ($Cl_2$, NaOCl).

A circulation loop is used for water which contains $ClO_2$. The concentration of $ClO_2$ in the water is 1.0±0.1 ppm. The pH of the water is 6.8±0.2. The temperature of the water is 90±1° C. The hoop stress applied to the pipe is about 1.7 MPa. The oxidation reduction potential (ORP) is 740 mV and is measured frequently. The flow volume is 23 l/h at a flow velocity of about 0.13 m/s and a fluid pressure of 6.5 bar. The free pipe length is 250 mm, the outer diameter of the pipe is 12 mm and the thickness of the wall is 2 mm. In the tests two pipes of each material are tested in series. Each pipe is tested until failure. The average of the two life time values is calculated.

The circulation loop used for $ClO_2$ testing is made from inert materials (e.g. titanium, PVDF (Polyvinylidene difluoride), PTFE (Polytetrafluoro-ethylene) to avoid contamination of the test fluid. The fittings are of PVDF. The test fluid is continuously purified in three steps to avoid any contamination: 1. active carbon filter, 2. particle filter, 3. reverse osmosis. The internal environment is the above-mentioned solution of $ClO_2$ in water, the external environment is air.

The $ClO_2$ is generated directly at the site using a commercial $ClO_2$-generator from Prominent following the equation:

$$5NaClO_2 + 4HCl \rightarrow 4ClO_2 + 2H_2O + 5NaCl$$

The mechanism for feeding the stock solutions ($NaClO_2$ and HCl) to the process are monitored to maintain a consistent ratio of chemicals.

All tests were carried out at Bodycote Polymer AB, Nyköping, Sweden.

d) Content of Antioxidant

Sample preparation: The polymer pellets are ground in an ultracentrifugal mill (Retsch ZM 100) with a sieve with 2 mm holes. The pellets are cooled down with liquid nitrogen. 5 g of the ground polymer is extracted in 50 ml of cyclohexane at a temperature of 81° C. for 2 hours. If needed, cyclohexane is then added to exact 50 ml again. The solution is cooled down in room temperature and thereafter the polymer is precipitated with 50 ml iso-propanol. A suitable amount of the solution is filtered and injected into an HPLC equipment.

The HPLC measurement can e.g. be performed with a reversed phase C-18 column and methanol and water as mobile phase, for example in a ratio of 85:15. A UV detector can be used, wavelength 280 nm. The quantification is made using calibration curves in a conventional manner.

e) Measurement of Phenolic Decomposition and/or by-Products Migration-into-Water Pipe samples (32×3 mm) were leached with unchlorinated water according to EN-12873-1 at room temperature (23±2° C.). Water from the third migration period was analyzed for content of organic compounds. Water samples were extracted with methylene chloride. Isotopically labelled internal standards were added to the water before said extraction. After concentration of the extracts, isotopically labelled injection standard was added, and the extracts were analyzed by gas chromatography with mass selective detector according to the draft CEN standard "The GC-MS identification of water leachable organic substances from materials in contact with water intended for human consumption". This draft CEN Standard has been prepared by CEN TC 164 WG3 AHG7 based on the co-normative research project EVK1-CT 2000-00052 and work funded by DG Enterprise and Industry (Grant Agreement S12.403892).

As procedural blank, ultra pure water (Milli-Q) stored in acid washed glassware under the same time periods as leaching tests, was extracted with methylene chloride and all standards were added as described in the test method.

The ratio of the surface area (S) of the test piece intended to come into contact with test water to volume (V) of the test water shall be expressed per decimeter, i.e. $dm^{-1}$ (which is $dm^2/dm^3$ or $dm^2$/liter). Surface-to-volume (S/V) ratio should be in the range of 5 $dm^{-1}$ to 40 $dm^{-1}$. In the present invention the ratio S/V was 15.4 $dm^{-1}$.

The concentrations were then calculated according to

[D]=AD/AI×[I]

where
[D] is the concentration of a compound D (in µg/liter);
AD is the peak area of compound D;
AI is the peak area of the internal standard;
[I] is the concentration of the internal standard (in µg/liter)

Phenolic compounds were quantified using the same compounds as calibrant, where possible. Other phenolic compounds found in the samples were quantified using structurally similar compounds.

2. Samples Prepared and Results Obtained

The compositions (Examples 1 to 3) were compounded/melt homogenized in a Buss-Co-Kneader 100 MDK/E-11 L/D. Polymer and additives were fed into the first mixer inlet of the Buss Co-Kneader which is a single screw extruder with a downstream discharge single extruder with pelletizing unit cutting pellets in molten stage and cooled via water. The mixer temperature profile was 113/173/199/193/200° C. from first inlet to outlet, and discharge extruder temperature 166° C. The mixer screw rpm was 201 rpm and the throughput 200 kg/h. Pipes 32×3 mm (outer diameter×wall thickness) were prepared by extrusion in a Battenfeld 45-25B extruder, which gave an output of 33 kg/h at a screw speed of 54 rpm. The extruder melt temperature was 215° C. Pipes 12×2 mm (outer diameter×wall thickness) were prepared by extrusion in a Battenfeld 45-25B extruder, which gave an output of 15 kg/h at a screw speed of 20 rpm. The extruder melt temperature was 214° C. 12×2 mm pipes were used in the lifetime tests, 32×3 mm pipes in the migration tests.

The following compounds were used in the preparation of the compositions/pipes:
2,5,7,8-Tetramethyl-2-(4',8',12'-trimethyltridecyl)chroman-6-ol (Irganox E 201™, vitamin E, CAS-no. 10191-41-0) commercially available from Ciba Speciality Chemicals,
1,3,5-Trimethyl-2,4,6-tris-(3,5-di-tert. butyl-4-hydroxyphenyl)benzene (Irganox 1330™, CAS-no. 1709-70-2) commercially available from Ciba Speciality Chemicals.

Carbon Black Masterbatch:

The carbon black masterbatch (Carbon black MB) contained 60.4 wt % high density polyethylene, 39.5 wt % carbon black and 0.1 wt % Irganox 1010.

Base Resin:

Polyolefin (A) used as base resin in all samples was an unstabilised bimodal medium density polyethylene with a total butene comonomer content of 3.2 wt % whereby the comonomer was present exclusively in the high molecular weight part of the polyethylene, an $MFR_5$ of 0.85 g/10 min, and a density of 940 kg/m$^3$.

Table 1 shows the compositions prepared. If not indicated otherwise, the values are given in wt %. Still further, in Table 1 the results of the lifetime tests in $ClO_2$-containing water and the results of the migration testing are also shown, the latter are given as total amount of phenolic compounds in water. Example 1 is a comparative Example, Examples 2 and 3 are according to the invention.

TABLE 1

|  | Example 1 | Example 2 | Example 3 |
|---|---|---|---|
| base polymer | 93.96 | 93.91 | 93.74 |
| Calcium stearate | 0.15 | 0.15 | 0.15 |
| Carbon black MB | 5.75 | 5.75 | 5.75 |

TABLE 1-continued

|  | Example 1 | Example 2 | Example 3 |
|---|---|---|---|
| Vitamin E/ppm | 374 | 247 | 258 |
| Irganox 1330/ppm | 993 | 1635 | 3589 |
| Antioxidants, total/ppm | 1367 | 1882 | 3847 |
| $ClO_2$-resistance/h | 1165 | 1693 | 2024 |
| total amount of phenolic comp./ppb | 3.6 | 3.9 | 4.2 |

The invention claimed is:
1. A pipe formed of a polyolefin composition consisting of
   a) a polyolefin base resin (A) consisting of a polyethylene homo- or copolymer, and a specific combination of two antioxidants consisting of (B) and (C):
   b) 150 to 500 ppm of an antioxidant (B) according to formula (I):

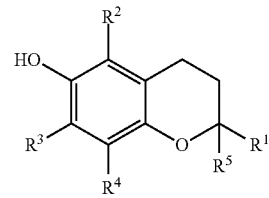

wherein $R^1$, $R^2$, $R^3$, $R^4$ and $R^5$ independently are H, or non-substituted or substituted aliphatic or aromatic hydrocarbyl radicals which may comprise heteroatoms, and
   c) 1600 to 5000 ppm of an antioxidant (C) according to formula (II):

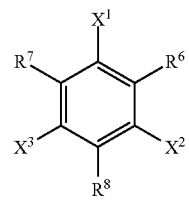

wherein $R^6$, $R^7$ and $R^8$ independently are non-substituted or substituted aliphatic or aromatic hydrocarbyl radicals which may comprise OH-groups, $X^1$, $X^2$, and $X^3$ independently are H or OH, with the provisio that at least one of $X^1$, $X^2$, and $X^3$ is OH, the entire molecule does not comprise an ester group, and the concentration of antioxidants (B) and (C) in the polyolefin composition is based on the total composition, and wherein a failure time of said pipe exceeds 1165 hours when tested according to ASTM F2263-03, modified by replacing chlorine with chlorine dioxide.

2. The pipe according to claim 1, wherein the concentration of antioxidant (C) in the polyolefin composition is at least 3400 ppm, based on the total composition.

3. The pipe according to claim 1, wherein antioxidant (C) is 1,3,5-Trimethyl-2,4,6-tris(3,5-di-tert. butyl-4-hydroxyphenyl)benzene.

4. The pipe according to claim 1, wherein antioxidant (B) is 2,5,7,8-Tetramethyl-2-(4',8',12'-trimethyltridecyl)chroman-6-ol.

5. The pipe according to claim 1, wherein from the composition an amount of at most 20 microgram of phenolic decomposition and/or by-products per liter of water (µ/L) migrates into water, measured according to the migration-into-water analysis method.

6. A pipe formed of a polyolefin composition consisting of
a) a polyolefin base resin (A) consisting of a polyethylene homo- or copolymer, and a specific combination of two antioxidants consisting of (B) and (C):
b) 150 to 500 ppm of an antioxidant (B) according to formula (I):

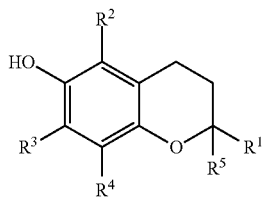

wherein $R^1$, $R^2$, $R^3$, $R^4$ and $R^5$ independently are H, or non-substituted or substituted aliphatic or aromatic hydrocarbyl radicals which may comprise heteroatoms,
c) 1600 to 5000 ppm of an antioxidant (C) according to formula (II):

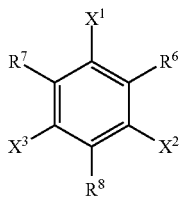

wherein $R^6$, $R^7$ and $R^8$ independently are non-substituted or substituted aliphatic or aromatic hydrocarbyl radicals which may comprise OH-groups, $X^1$, $X^2$, and $X^3$ independently are H or OH, with the provisio that at least one of $X^1$, $X^2$, and $X^3$ is OH, the entire molecule does not comprise an ester group, and the concentration of antioxidants (B) and (C) in the polyolefin composition is based on the total composition, and wherein a failure time of said pipe exceeds 1165 hours when tested according to ASTM F2263-03, modified by replacing chlorine with chlorine dioxide, and
d) optionally pigments, stabilizers, anti-acids, anti-UV agents, antistatic agents and processing aids in an amount of 10 wt % or below.

7. A method for the transport of chlorine dioxide-containing water, comprising passing chlorine dioxide-containing water through a pipe according to claim 1.

8. A method for increasing the resistance of a polyolefin composition against degradation caused by contact with chlorine dioxide-containing water, comprising formulating a polyolefin composition consisting of
a polyolefin base resin (A) consisting of a polyethylene homo- or copolymer with a specific combination of two antioxidants consisting of (B) and (C):
antioxidant (B) according to formula (I):

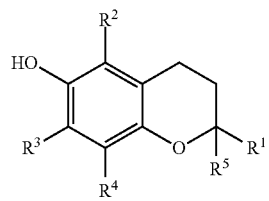

wherein $R^1$, $R^2$, $R^3$, $R^4$ and $R^5$ independently are H, or non-substituted or substituted aliphatic or aromatic hydrocarbyl radicals which may comprise heteroatoms, and
antioxidant (C) according to formula (II):

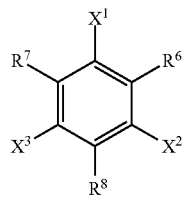

wherein $R^6$, $R^7$ and $R^8$ independently are non-substituted or substituted aliphatic or aromatic hydrocarbyl radicals which may comprise OH-groups, $X^1$, $X^2$, and $X^3$ independently are H or OH, with the provisio that at least one of $X^1$, $X^2$, and $X^3$ is OH, the entire molecule does not comprise an ester group, and the concentration of antioxidant (B) is from 150 to 500 ppm, and the concentration of antioxidant (C) in the polyolefin composition is from 1600 to 5000 ppm, based on the total composition, such that a failure time of said pipe exceeds 1165 hours when tested according to ASTM F2263-03, modified by replacing chlorine with chlorine dioxide.

* * * * *